(12) United States Patent
Kurz (10) Patent No.: US 6,923,174 B1
(45) Date of Patent: Aug. 2, 2005

(54) DEVICE WHICH FOLLOWS THE POSITION OF THE SUN

(75) Inventor: Walter Kurz, Fürth (DE)

(73) Assignee: Leonhard Kurz GmbH & Co., Furth (DE)

( * ) Notice: Subject to any disclaimer, the term of this patent is extended or adjusted under 35 U.S.C. 154(b) by 0 days.

(21) Appl. No.: 10/031,006

(22) PCT Filed: May 26, 2000

(86) PCT No.: PCT/DE00/01778

§ 371 (c)(1),
(2), (4) Date: Oct. 29, 2001

(87) PCT Pub. No.: WO00/73810

PCT Pub. Date: Dec. 7, 2000

(30) Foreign Application Priority Data

May 29, 1999 (DE) ................................. 199 24 783

(51) Int. Cl.$^7$ ................................................. F24J 2/08
(52) U.S. Cl. ...................... 126/698; 126/600; 126/696; 126/700
(58) Field of Search ................................. 126/600, 601, 126/605, 698–700, 696, 573–578; 359/742, 359/741; 136/246

(56) References Cited

U.S. PATENT DOCUMENTS

| | | | |
|---|---|---|---|
| 4,054,356 A | 10/1977 | Noguchi | |
| 4,456,783 A | 6/1984 | Baker | |
| 4,723,826 A | 2/1988 | Whitaker | |
| 4,765,726 A | 8/1988 | Johnson | |
| 4,848,319 A * | 7/1989 | Appeldorn | 126/700 |
| 5,491,569 A | 2/1996 | Riccobono et al. | |
| 5,941,239 A * | 8/1999 | Rogers | 126/698 |
| 6,025,583 A | 2/2000 | Whitehead | |
| 6,302,100 B1 * | 10/2001 | Vandenberg | 126/698 |

FOREIGN PATENT DOCUMENTS

| | | |
|---|---|---|
| DE | 30 12 500 A1 | 10/1981 |
| DE | 3141 789 C2 | 5/1982 |
| DE | 197 16 418 A1 | 9/1998 |

* cited by examiner

Primary Examiner—James C. Yeung
(74) Attorney, Agent, or Firm—Hoffmann & Baron, LLP (57) ABSTRACT

A solar installation is described. It has a solar element and a diffractively and/or refractively operating optical apparatus by way of which the incident sunlight is passed directedly perpendicularly on to the solar element. The optical apparatus is caused to track the position of the sun by way of a tracking device.

The optical apparatus uses a light-deflecting foil having portions of different natures with a structure having a different optical action. By virtue of the action of the tracking device the holographic foil is moved relative to the solar element so that different portions of the foil move into an operative position above the solar element in succession during the tracking procedure.

16 Claims, 5 Drawing Sheets

DEVICE WHICH FOLLOWS THE POSITION OF THE SUN

This application claims priority based on an International Application filed under the Patent Cooperation Treaty, PCT/DE00/01778, filed on May 26, 2000, and German Application No. 199 24 783.8, filed on May 29, 1999.

BACKGROUND OF THE INVENTION

The invention concerns a diffractively and/or refractively operating optical apparatus for passing incident light, preferably sunlight, on to a receiver, preferably on to a solar element. The optical apparatus includes a tracking device which is controlled based on the variation with respect to time of the relative position of the light source and the receiver, preferably based on the position of the sun.

Optical apparatuses that track the direction of sunlight are used in solar installations. They are associated with the solar elements, to make the most efficient possible use of the sunlight; in order to direct the incident sunlight on to the solar element on an angle as close to perpendicular as possible. In the practical context of solar engineering, this is accomplished by using focusing systems with lenses and parabolic mirrors, which suitably deflect and concentrate the light. In order to achieve an optimum effect, these systems track the movement of the sun. This requires large and expensive tracking devices, which precisely control the position of these generally bulky and heavy optical apparatuses.

A press release in the newspaper "Frankfurter Allgemeine Zeitung," supplement No. 144 of 28th Jul. 1994, contained a report about the use of holographic foil for applying sunlight to solar cells. The holographic foil is intended to replace conventional prisms and lenses. The foil divides up the light spectrum and directs the divided up light to solar cells, which are specifically designed for the respective spectral range.

DE 31 41 789 A1 discloses a sun ray concentrator having a body which is in the form of a prism and has a material layer with a hologram structure on the entrance face and on the reflection face. The parameters of the hologram structure are so selected that the radiation is passed by means of the hologram into the prism where it is redirected in such a way that it issues focused at a plurality of end faces of the prism. In that situation, the radiation is concentrated and at the same time the arrangement provides for division into the various spectral ranges, with concentration of the various spectral ranges on the various ray exit faces. This allows light to be directed to specific photoconverters for the respective spectral range. However, the sun ray concentrator consisting of prisms suffers from the above-described disadvantages in terms of tracking. In addition, because of the prisms, shadow effects occur which reduce the conversion rate.

U.S. Pat. No. 4,054,356 A1 discloses a sun ray concentrator which is in the form of a hologram of a light spot source. The focal point of the hologram lens, however, is found to be so large that, for the purposes of arranging a receiver for concentrated radiation at the focal point of the lens, an auxiliary device connecting the receiver to the lens is required. In addition, this arrangement involves irregular distribution of energy at the surface of the receiver.

DE 30 12 500 A1 discloses a retroreflector for use in light barriers and light curtains. The reflector uses diffraction gratings which are formed by holographic procedures in a photosensitive material. When the reflector is illuminated, the radiation impinging thereon is reflected and focused outside the reflector plate with the hologram.

SUMMARY OF THE INVENTION

The object of the invention is to provide an optical apparatus of the kind set forth in the opening part of this specification, which is of a simple structure and affords the respectively desired light deflection and/or light concentration effect. The optical apparatus provides particularly efficient conversion of light for uses in solar installations.

The optical apparatus of the invention includes a transparent or reflective optical body having diffractive and/or refractive and/or holographic regions. In a first embodiment, "combination (a)," the optical body has portions of a different nature with respect to one or more of its optical parameters along the tracking direction. The different portions of the optical body can be brought into and out of the operative position by the action of the tracking device on the optical body and/or the receiver. The tracking device controls the relative position of the optical body with respect to the receiver. In a second embodiment, "combination (b)," the optical body is in the form of a foil and/or is on a foil, which can be tracked by way of the tracking device. The tracking device controls the with relative position of the optical body with respect to the receiver by rolling up and unrolling the foil.

In accordance with combination (a), the optical body includes different regions selected from diffractive regions, refractive and holographic regions, which have portions of a different nature in terms of their optical parameters. This allows precise tracking to be implemented in a particularly simple manner. The tracking device which acts on the optical body and/or on the receiver produces a relative movement between the optical body and the receiver. The tracking movement causes the different portions of the optical body to move successively into the operative position. The portion of the optical body, which is in the operative position, directs the light incident at that time on to the receiver at the desired irradiation angle or with the desired concentration.

In combination (b), the optical body is in the form of a foil and/or is on a foil, which can be rolled up and unrolled by way of the tracking device. This design provides fundamental advantages in terms of simplicity of structure and costs.

Particular advantages are enjoyed when the invention is used in solar installations. The receiver is in the form of a solar element which can remain stationary while the position of optical device is controlled to track the position of the sun. Corresponding advantages are enjoyed when the invention is used in hothouses.

The body of the optical apparatus, which includes different regions selected from diffractive regions, refractive regions and holographic regions, preferably has a flat light entrance face and a flat light exit face. The sunlight impinges on the light entrance face at a given angle of incidence depending on the instantaneous position of the light source relative to the receiver. In solar installations, the angle of incidence depends on the position of the sun. The incident light passes through the body and is deflected or concentrated so that the light issues from the body at the light exit face and is passed to the receiver at a given exit angle or with a given concentration. The optical parameters of the body are selected to provide a desired exit angle or concentration. When the invention is used in solar engineering applications, the optical parameters of the body provide an exit angle that makes optimum use of the sunlight by directing the sunlight on to the solar element at the most efficient irradiation angle. Preferably, an irradiation angle of 90°, or maximum concentration, is achieved.

The portions of the optical body, which differ in terms of their optical parameters, can be arranged on or in the body in mutually juxtaposed relationship in the tracking direction. The portions can be in the form of portions which blend continuously into each other or in the form of separate discrete portions. An arrangement with a continuous transition of the portions affords advantages in applications that use continuous tracking. Particular advantages in that respect are achieved if the variation in the optical parameters in the tracking direction is also continuous with a steady progression.

In preferred embodiments, the optical body or the foil has at least one region in layer form, with a light diverting and/or concentrating structure. The optical body can be provided with holographic elements, for example the body may have a preferably layered region having a hologram structure. The portions which differ in terms of the optical parameters may be implemented by the portions having different hologram structures. Instead of or in addition to the hologram structure, the optical body may have a structure of a diffractive lens or a diffractive mirror, which is used to substantially concentrate the light. In order to minimize reflection losses at the optical body or the foil, the optical body or the foil can be de-reflected on the side which faces towards the light source.

The body can be in the form of a rigid or flexible body. Particular advantages are attained when using a holographic foil. The foil can also be in the form of a concentrator foil with the structure of a diffractive lens or a diffractive mirror. The foil may have a plurality of regions involving different lens structures or different mirror structures, those regions being arranged in succession in the tracking direction.

Tracking can be implemented in a particularly simple manner by associating the regions of the foil which are different along the tracking direction with at least one solar element. In this embodiment of the invention, a first one of the regions co-operates for a first period of time of one or more days with a solar element and a second region of the foil which is adjacent to the first region co-operates for a subsequent second period of time of one or more days with the solar element. For that purpose, the foil may have regions which can be associated with the individual days of a year or half year, preferably 365 or 182 or 183 different regions.

In the case of larger solar installations having a large number of solar elements, a particularly simple structure is afforded if it is provided that a plurality of solar elements are arranged in longitudinal and transverse rows in a grid arrangement and/or the optical body has a plurality of separate regions which are arranged in longitudinal and transverse rows in a grid arrangement, preferably in a corresponding grid arrangement to the solar elements. To implement tracking for compensating for the variation in the position of the light source, the grid arrangement of the solar elements and/or the regions of the optical body is turned through an acute angle relative to the tracking direction and/or the direction of movement of the optical body. Tracking with compensation for the variation in the position of the sun over the course of the year can be achieved if an angle of 0.25° is adopted.

If spectral division of the light occurs at the foil, preferably when the sunlight passes through the holographic foil, spectrum-specific solar cells can be used. A plurality of such spectrum-specific solar cells are arranged in mutually juxtaposed relationship so that the individual light spectra is fed to the respective solar cells.

When using a flexible foil, the tracking device can be configured as a particularly simple structure that operates reliably and precisely. The tracking device can be in the form of a foil transport device having at least one foil storage device which receives and/or delivers the foil, preferably a drum. Preferably, there is a first drum which winds up the foil during tracking and a second drum which unwinds the foil during tracking. In this embodiment, a foil portion is arranged, preferably in a tensioned condition, between the first and second drums and includes the operative portion of the light guide and/or light concentrator device. To implement tracking, the first drum is driven in rotation by way of a motor drive. The second drum runs synchronously therewith.

In particular arrangements of the tracking device, there is provided a first transport device which moves the optical body along its main extent. In addition, there can be provided a second transport device which moves the optical body at an angle, preferably at a right angle, with respect to its main extent, or which moves it rotatably about an axis parallel to its main extent. The first or the second transport device is controlled in dependence on the time of day, that is to say in dependence on the position of the sun at the time of day. The other transport device is controlled in dependence on the time of year, that is to say in dependence on the position of the sun at the time of the year.

BRIEF DESCRIPTION OF THE DRAWINGS

Further details, features and advantages will be apparent from the description hereinafter of a number of embodiments diagrammatically illustrated in the drawing in which.

DESCRIPTION OF THE PREFERRED EMBODIMENTS

Figure 1:
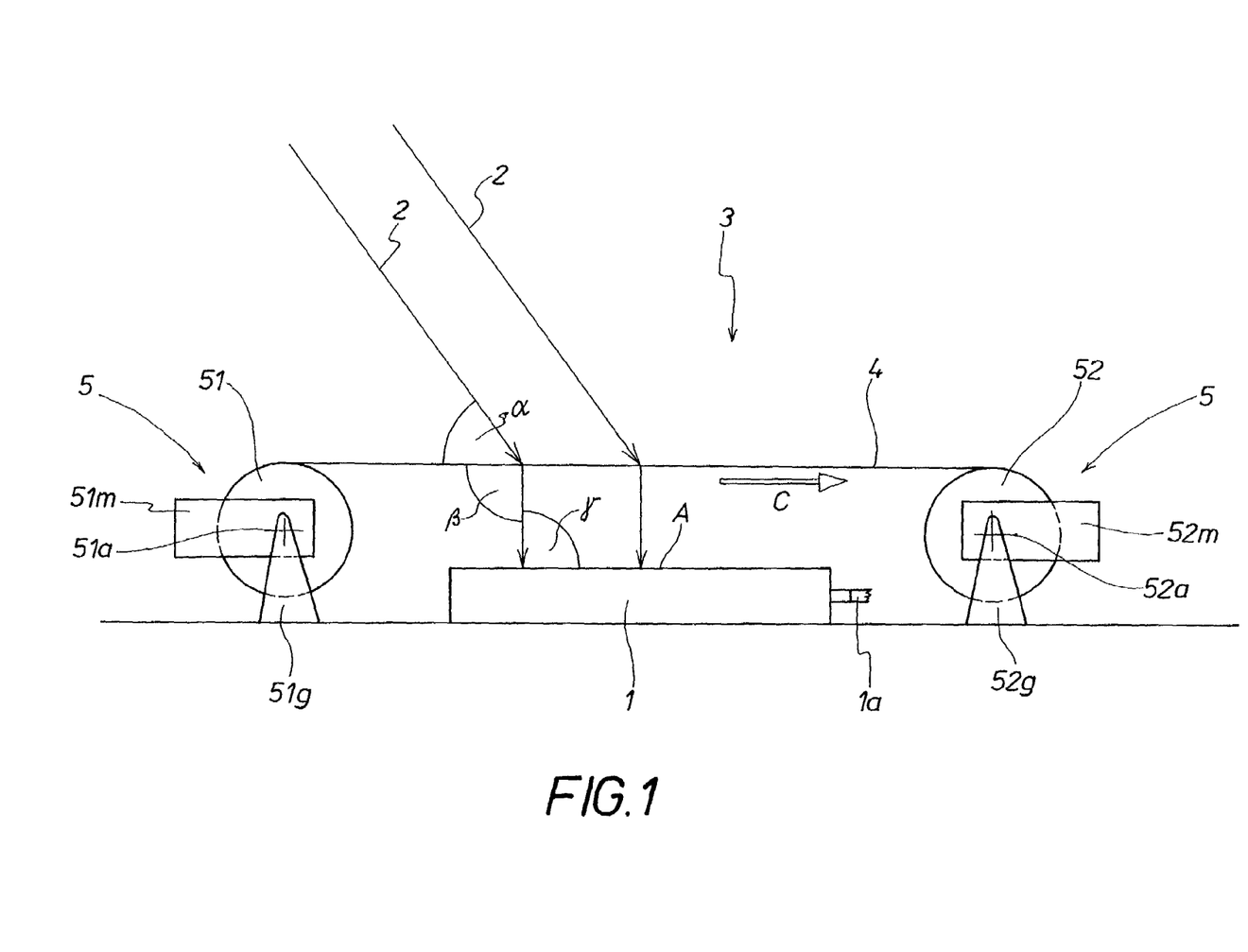
FIG. 1 is a diagrammatic view of a solar installation.
Figure 2:
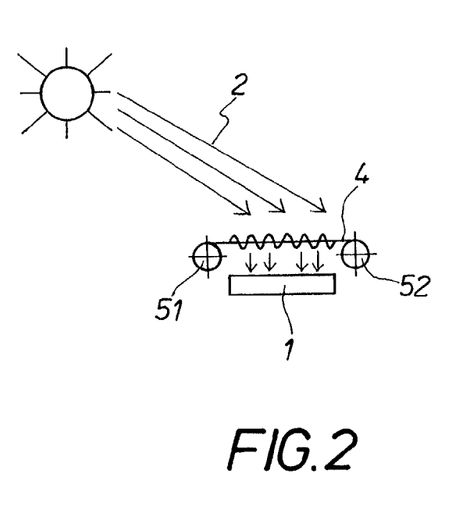
FIG. 2 is a simplified stylized representation of the solar installation of FIG. 1 with the position of the sun in the morning.
Figure 3:
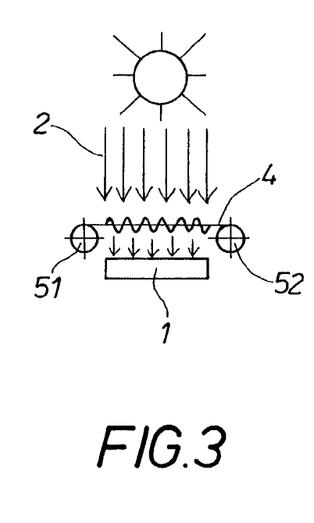
FIG. 3 is a simplified stylized representation of the solar installation of FIG. 1 with the position of the sun at midday.
Figure 4:
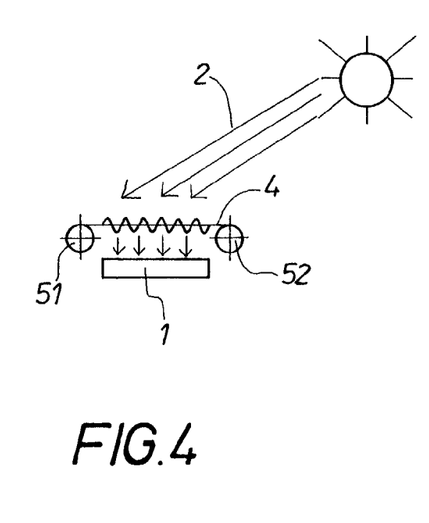
FIG. 4 is a simplified stylized representation of the solar installation of FIG. 1 with the position of the sun in the afternoon.

The solar installation in FIG. 1 has a solar element 1. The solar element 1 can be an individual solar element or it can be a battery of solar elements arranged in mutually juxtaposed relationship. The solar element 1 can be in the form of a photovoltaic solar cell or a heat-generating solar collector. The sunlight 2 which is irradiated on to the solar element 1 is converted by the solar element 1 into electrical or heat energy. The energy produced is fed at the output 1*a* of the solar element into a network (not shown) or an energy storage arrangement.

Associated with the solar element 1 is an optical apparatus 3 which passes the sunlight 2, which is incident at the angle α in dependence on the position of the sun, on to the surface of the solar element 1. The optical apparatus 3 directs the sunlight 2 on to the surface of the solar element 1 at an angle as perpendicular to the surface of the solar element 1 as possible in each case, in order to make the most efficient possible use of the sunlight.

The optical apparatus 3 has a diffractively and/or refractively operating optical body 4 through which the sunlight 2 passes and which deflects the sunlight 2. In the illustrated embodiment, the optical body 4 is in the form of a transparent holographic foil which is tensioned at a distance above the surface of the solar element 1.

The hologram structure of the irradiated portion of the foil 4, which is arranged above the solar element, is such that the sunlight 2 which is incident on the surface of the foil 4 at the angle α, is deflected on passing through the foil and issues at an angle β at the underside of the foil. The arrangement of the solar element 1 is so selected that the sunlight issuing at the angle β is directed at an angle of preferably 90° on to the surface A of the solar element 1. In the illustrated embodiment, the exit angle equals 90° (β=90°) and the foil is tensioned in a plane parallel to the surface A of the solar element 1.

In order to provide efficient use of the sunlight 2 at any position of the sun, the optical apparatus 3 has a tracking device 5 which changes the position of the foil 4 to track the position of the sun relative to the stationary solar element 1. The tracking device 5 has two synchronously driven drums 51, 52. The first and second drums 51, 52 are arranged parallel to each other at a mutual spacing. They are each rotatably supported in stationary mounting pedestals 51*g*, 52*g*. The foil 4 is tensioned between the drums 51, 52, with the two opposite ends of the foil 4 being wound on the drums 51, 52. The drums 51, 52 are driven in a controlled manner by motor means in such a way that they rotate synchronously about their drum axis 51*a*, 52*a*. The direction of rotation in FIG. 1 is in the clockwise direction so that the foil 4 which is tensioned between the drums 51, 52 is transported from left to right in the direction C. The speed of the transport movement is controlled based on the variation of the position of the sun during the day.

During the tracking procedure, the foil 4 moves continuously in the direction C. The foil is wound on to the second drum 52 and unwound from the first drum 51. Only the foil portion which is disposed in the tensioned portion above the solar element 1 at any particular time has the incident sunlight passing therethrough and only that portion is operative at the time.

Along its main extent, that is to say in the direction of its surface and thus in the tracking direction C, the foil 4 has a varying hologram structure. The variation in the parameters of the hologram structure is selected so that, with a given predetermined speed of transport or tracking movement, continuous adaptation of the light deflection effect to the angle of incidence α (which is dependent on the position of the sun and the foil 4), is attained. The adaptation of the hologram structure is such that the exit angle β is approximately constant in the course of the day with the angle of incidence α which is dependent on the position of the sun. That means that the angles β and γ (the angle of incidence for the light at the surface of the solar element 1) are approximately constant in the course of the day at any position of the sun. Thus, the sunlight is efficiently used at any position of the sun.

In order to provide for adaptation in terms of the time of year, tracking is additionally provided for the angular position of the plane of the foil 4 with respect to the surface A of the solar element 1. In this embodiment, the plane of the foil is pivoted, preferably together with the drums 51, 52, about a pivot axis that extends parallel to the surface of the solar element in the direction C. The drums 51, 52 are provided with suitable angular tracking by a pivoting mechanism (not shown) which, for example, is arranged in the region of the mounting pedestals 51*g*, 52*g*.

The rotary drive for the drums 51, 52 for the above-described tracking of the foil in the direction C, with respect to the time of day, is provided by separate drive motors 51*m*, 52*m*. The drive motor 51*m* drives the drum shaft 51*a*. For that purpose, the drive output shaft (not shown) of the drive motor 51*m* is coupled to the drum shaft 51*a* by way of a transmission (not shown). The drive motor 52*m* drives the drum shaft 52*a* in a corresponding manner. The two motors 51*m*, 52*m* are controlled synchronously. The control system controls the transport speed, that is the tracking of the foil 4 in the direction C, based on the variation in the position of the sun, with respect to the time of day.

The foil is retracted at night. That is effected by the drive motors running back in the opposite direction and the foil being unwound from the second drum 52 and wound on to the first drum 51.

The pivotal movement of the drums 51, 52, which is required for tracking in terms of the time of year, can also be effected by motor means, by way of a drive motor (not shown) which actuates the above-discussed pivoting mechanism in a suitably controlled fashion.

In the embodiment described above, it was assumed that there was a substantially continuously varying, light-deflecting hologram structure on the foil or the transparent optical body and, accordingly, that the foil performed a continuous movement over the solar element. It will be appreciated that it is also possible for the optical body to be provided in a quasi discontinuous manner with a corresponding, light-deflecting structure, for example in the form of stripes of the same structure. In this embodiment, the optical body would have to be moved in a correspondingly discontinuous or step-wise manner with respect to the solar element.

Figure 5:
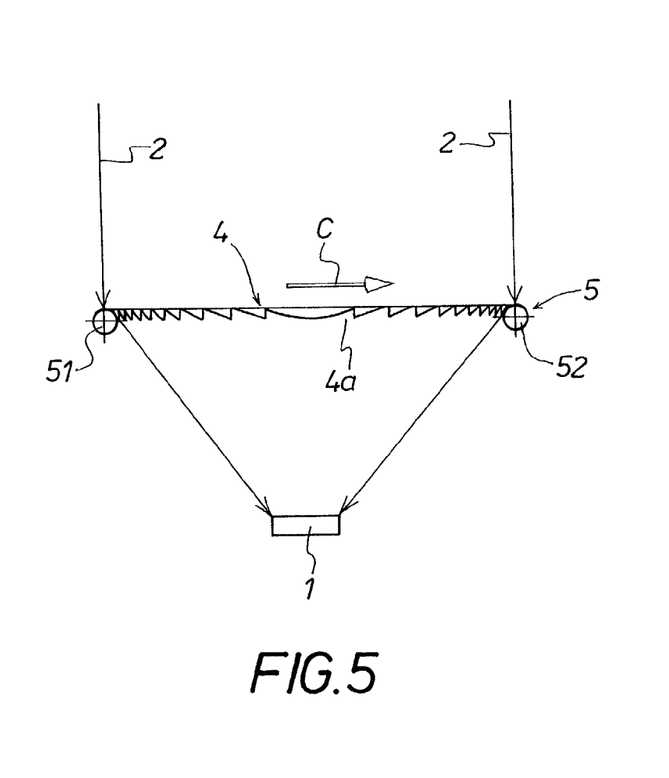
FIG. 5 is a simplified stylized representation of a solar installation with a foil with a diffractive lens, in the form of a concentrator, with the position of the sun at midday.
Figure 6:
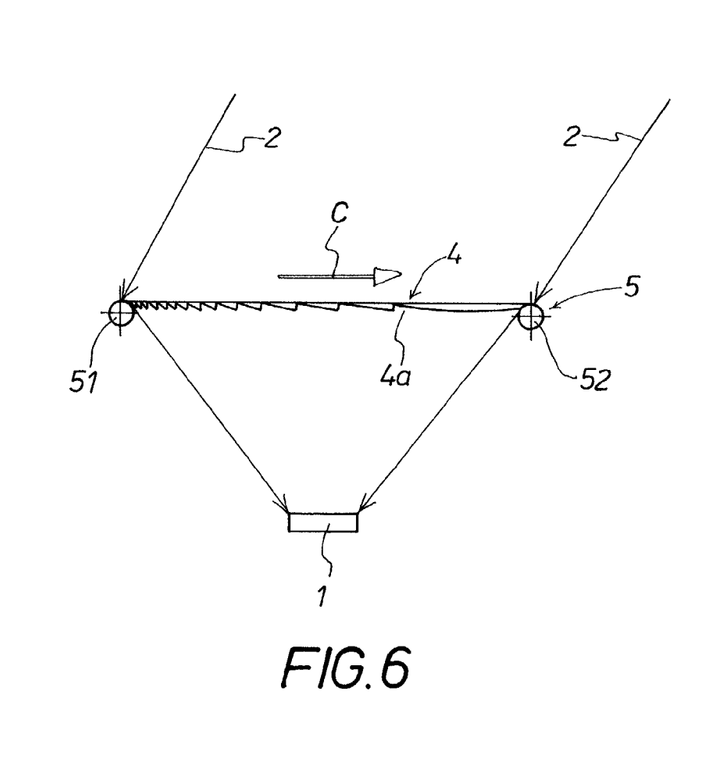
FIG. 6 is a simplified stylized representation of the solar installation of FIG. 5 with the position of the sun in the afternoon.

The embodiment shown in FIGS. 5 and 6 also involves a solar installation with a diffractive foil which is guided over a solar element 1. A tracking device 5 controls the position of the diffractive foil so that it tracks the position of the sun with respect to the time of day by winding the diffractive foil on and off the drums 51, 52. The drums 51, 52 are only diagrammatically indicated and they are substantially larger than shown in the figures and are mounted at a suitable spacing from each other. Unlike the preceding embodiments, the foil 4 used in FIGS. 5 and 6 is a foil which concentrates the incident sunlight. This involves a foil concentrator in the form of a diffractive lens 4*a*. On passing through the lens 4*a*, the incident sunlight is concentrated so that the image of the sun appears in the solar element 1 arranged at the focal point. When using a foil with a lens diameter of between 1 and 5 cm, the spacing of the foil 4 relative to the surface A of the solar element is between 10 and 20 cm.

During the day, the foil 4, which is tensioned above the solar element 1, is displaced by the tracking device 5 from left to right in the Figures, that is in the East-West direction. This displacement of the foil 4 allows the image of the sun, which shines down at different angles according to the time of day, to continuously fall on the stationary solar element 1. FIG. 5 shows the position of the foil 4 with the angle of incidence of the sunlight 2 approximately perpendicular to the surface of the foil 4, which would be the relationship at the midday time. FIG. 6 shows the position of the foil 4 with the sunlight 2 at an inclined angle of incidence, which would be the relationship in the afternoon. As can be seen from FIG. 6, when the direction of sunlight 2 forms an inclined angle of incidence, the position of the foil 4 or the lens 4a is caused to track by displacement towards the right.

The transport speed of the foil 4 for tracking with respect to the time of day is f× 0.25 per hour, wherein 'f' is the focal length of the lens. This tracking speed takes into consideration the change in the angle of light incidence, which occurs by virtue of the variation in the position of the sun in terms of the time of day and which is about 15° per hour and results in precise tracking with respect to the time of day.

Figure 7:
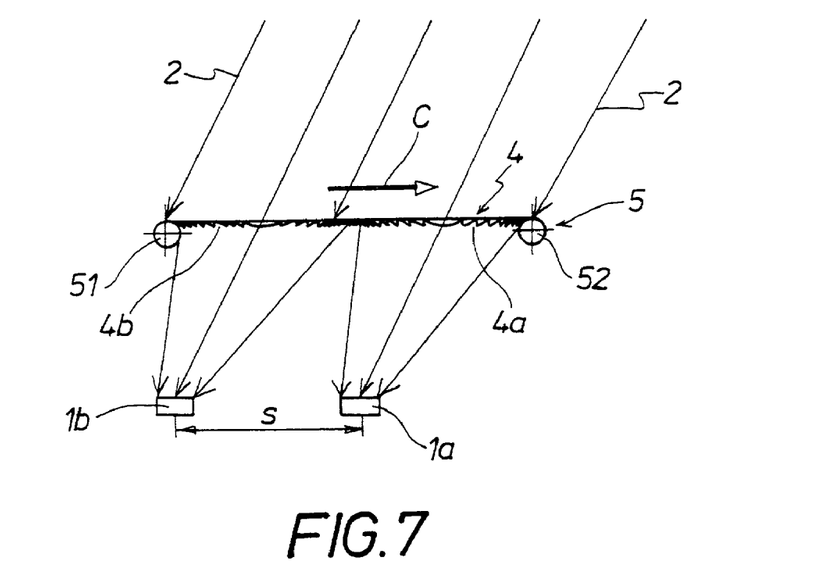
FIG. 7 is a simplified stylized representation of a solar installation with a plurality of solar elements.

In modified embodiments, a plurality of solar elements 1a, 1b are arranged in succession in the direction of movement of the foil 4. FIG. 7 shows such an arrangement of two solar elements 1a, 1b. The foil 4, which is tensioned above the solar elements 1a, 1b, has two lenses 4a, 4b which are arranged in succession in the direction of movement C of the foil. As can be seen from FIG. 7, the lens 4a is associated with the solar element 1a and the lens 4b is associated with the solar element 1b; the lens 4a illuminates the solar element 1a and the lens 4b illuminates the solar element 1b. The spacing S of the solar elements 1a, 1b is equal to the spacing between the center lines of the lenses 4a, 4b. Due to the tracking movement of the foil 4 according to the time of day, the image of the sun tracks the position of the sun at the respective time of day. As a consequence, the image of the sun is continuously incident through the lens 4a to a constant position on the solar element 1a and through the lens 4b to a respective constant position on the solar element 1b.

In the embodiments of FIGS. 5, 6 and 7, a plurality of solar elements 1a, 1b and so forth may be arranged in mutually juxtaposed relationship in one or more rows transversely with respect to the direction of movement of the foil. When using foils with annular lenses, a plurality of lenses 4a, 4b and so forth are arranged on the foil in the transverse direction. The lenses and the associated solar elements of a transverse row are respectively arranged in such a way that the spacing between the center lines of adjacent lenses is equal to the spacing of the associated adjacent solar elements. In that way, a respective lens of a transverse row is associated with each solar element of a transverse row. The tracking movement of the foil 4, with respect to the time of day, ensures that each solar element is in each case illuminated permanently during the day by way of the lens associated therewith.

Figure 8:
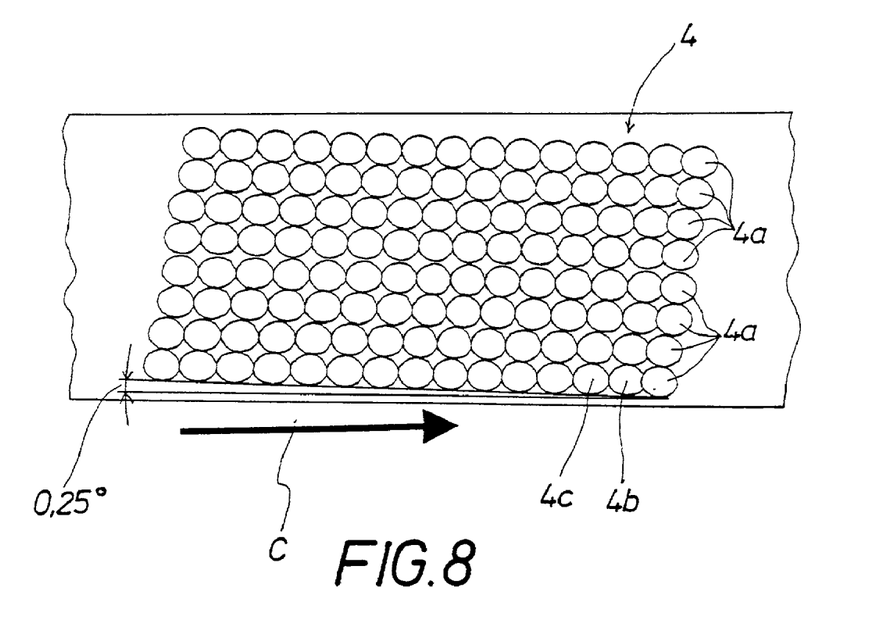
FIG. 8 shows a foil with lenses in a grid arrangement.

FIG. 8 shows a foil portion with lenses 4a, 4b, 4c arranged in a raster or grid arrangement on the foil. The lenses are arranged in mutually juxtaposed relationship in longitudinal and transverse rows which extend at a right angle to each other. In this embodiment, the grid arrangement is turned through an angle of about 0.25° with respect to the direction C in which the foil 4 moves and extends. The angle of 0.25° corresponds to the daily change in the angle of the sun with respect to the solar panel; that change in angle is 47°/182 per day. In that way, it is possible to compensate for the daily change in angle of the sun merely by displacement of the foil in the direction C, that is to say without additional adjustment.

Figure 9:
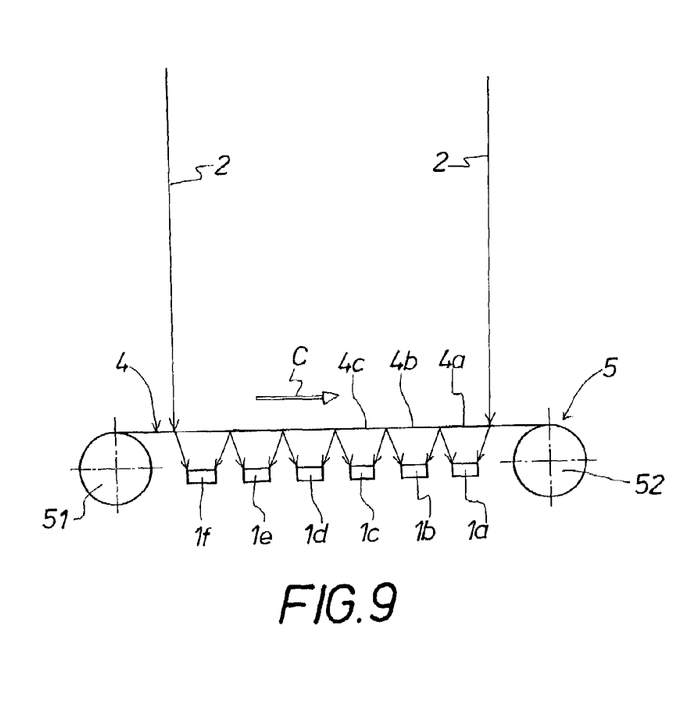
FIG. 9 is a simplified stylized representation of a solar installation using the foil of FIG. 8.

FIG. 9 shows the use of the foil 4 shown in FIG. 8 in a solar installation. The foil is tensioned above the solar elements 1a to 1f arranged in a grid arrangement and is wound on and unwound in the direction C, that is in the East-West direction. In this case, tracking with respect to the time of day takes place as in the preceding embodiments by displacement of the foil in the course of the day from left to right, as shown in FIG. 9. Throughout the entire day, there is always a respective lens associated with a given solar element so that the solar element is illuminated through that respective lens. For tracking purposes with respect to the time of year, the foil is displaced by a line spacing each day so that each solar element is illuminated by a lens for only one day. On the following day, the adjacent solar element is illuminated through the following lens. The tracking effect is positively produced upon movement of the foil in the direction C, by virtue of the grid arrangement being turned through the angle of 0.25°. For, due to the grid arrangement being turned in that way, with the daily change in the height of the sun with respect to the time of year above the horizon, relative displacement of the lenses perpendicularly to the direction of propagation is achieved. Thus, the change in the position of the sun, in terms of the time of year, is compensated.

This means that, in the embodiment shown in FIG. 9, the tracking action with respect to the time of day and also with respect to the time of year is effected by the tracking movement of the foil 4 in the direction C. The foil 4 can have 182 different lenses arranged in succession in the direction of movement and within a year is moved once completely to and fro by way of the tracking device 5, that is to the right in the first half-year in FIG. 9 and to the left in the second half-year.

In modified embodiments which, unlike FIGS. 8 and 9, do not have a grid arrangement which is turned through an angle, tracking with respect to the time of year can also be effected. This is accomplished by pivotal movement of the plane of the foil about the axis of movement of the sliding motion, or by displacement of the foil in a plane which is inclined with respect to the horizontal and which is towards the sun. When the solar element is arranged on the inclined roof structure of a house, which faces towards the sun, tracking with respect to the time of year occurs by displacement of the foil parallel to the inclined roof structure, either upwardly or downwardly.

Figure 10:
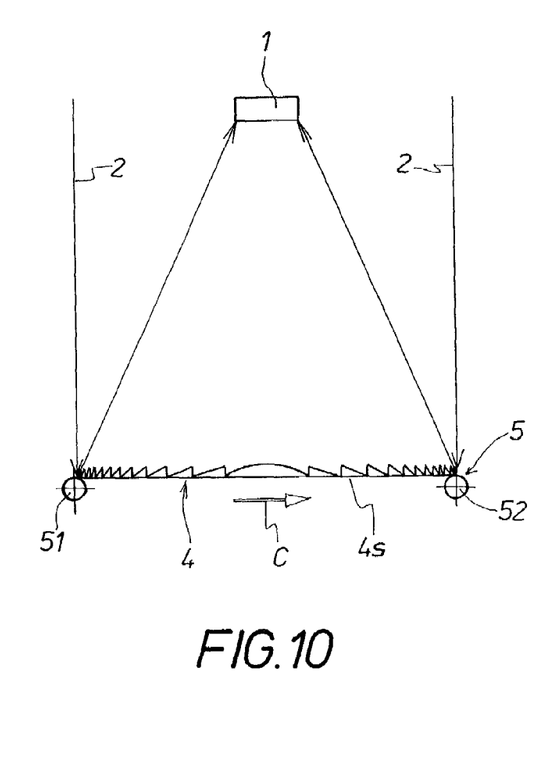
FIG. 10 is a simplified stylized representation of a solar installation with a foil with a diffractive concave mirror, in the form of a concentrator.

In the modified embodiment shown in FIG. 10, the foil 4 has a diffractive, concave mirror 4s in place of the diffractive lens. The solar element 1 is arranged on the side of the foil 4, which is towards the sun, at a spacing f (where f=focal length) in relation to the foil 4. The sunlight which is incident on the mirror 4s is concentrated so that the image of the sun falls on the surface A of the solar element. In a corresponding manner to the preceding embodiments, tracking of the foil is effected by way of a tracking device 5, by displacement of the foil in the direction C. The mirror foil may also have a plurality of mirrors 4s arranged in longitudinal and transverse rows. The foil can be of a corresponding structure to the foils with a lens structure, which have been described with reference to the embodiments of FIGS. 5 to 9. Embodiments similar to FIGS. 4 to 9 are possible with the mirror foils.

The heightwise profile of the diffractive lenses and mirrors used in the described embodiments comprises concentric zones of spherical and paraboloidal cross-sections. Instead of or in addition to those concentric structures, the foils 4 may also have transverse structures. The foils may also be operative to deflect and concentrate light at the same time.

What is claimed is:

1. An optical apparatus comprising:
a receiver comprising a solar element, wherein incident light from a light source, preferably sunlight, is passed on to the solar element,
a transparent or reflective optical body, and
a tracking device for moving the optical body in a tracking direction, wherein the tracking device is controlled in dependence on the variation with respect to time of the relative position of the light source and the receiver, preferably in dependence on the position of the sun,
wherein the optical body comprises different regions selected from diffractive regions, refractive regions and holographic regions, which deflect, concentrate or deflect and as well concentrate the light,
wherein the optical body is formed as a foil, or the optical body is attached to a further foil, or the optical body is formed as the foil, which is attached to the further foil,
wherein the optical body has a plurality of different portions along the tracking direction due to the different regions, wherein the different portions differ by one or more optical parameters,
wherein the optical body is positioned by the tracking device with relative movement with respect to the receiver by rolling up and unrolling the foil, wherein one or more different portions of the optical body are brought into or out of an operative position, wherein in the operative position the light is passed via the respective one or more different portions of the solar element, and
wherein the foil is positioned so that light is passed on to the solar element and that at least one of the different portions is associated with the solar element and a first different portion co-operates for a first period of time of one or more days with the solar element and a second different portion adjacent the first different portion co-operates for a subsequent second period of time of one or more days with the solar element.

2. The apparatus according to claim 1, wherein different portions are associated with the individual days of a year or half-year, preferably 365 or 182 or 183 different portions.

3. The apparatus according to claim 1, wherein a plurality of solar elements are arranged in longitudinal and transverse rows in a grid arrangement and the optical body has a plurality of separate regions which are arranged in longitudinal and transverse rows in a grid arrangement, preferably in a corresponding grid arrangement to the plurality of solar elements.

4. The apparatus according to claim 3, wherein the grid arrangement of the solar elements and the separate regions of the optical body is turned through an acute angle relative to the tracking direction and the direction of movement of the optical body, preferably through an angle of 0.25°, to compensate for the variation in the position of the sun over the year.

5. The apparatus according to claim 1, wherein the tracking device has a first transport device which moves the optical body in a first tracking direction along its main extent.

6. The apparatus according to claim 5, wherein the tracking device has a second transport device which moves the optical body in a second tracking direction in angular relationship with its main extent.

7. The apparatus according to claim 6, wherein the first and second transport devices are controlled in dependence on the time of day.

8. The apparatus according to claim 6, wherein the first or the second transport device is controlled in dependence on the time of year.

9. The apparatus according to claim 5, wherein the optical body is in the form of a flexible foil and the transport device is in the form of a foil transport device having at least one foil storage device for receiving or delivering the foil.

10. The apparatus according to claim 9, wherein there is provided a first drum which winds up the flexible foil during the tracking operation and a second drum which unwinds the foil during the tracking operation and wherein a portion of the foil is arranged in the operative position over the solar element between the first and second drums.

11. The apparatus according to claim 1, wherein the different portions are arranged in mutually juxtaposed relationship in the tracking direction, wherein the portions blend continuously into each other or are separate discrete portions.

12. The apparatus according to claim 1, wherein the optical body is rigid or flexible.

13. The apparatus according to claim 1, wherein the optical body or the foil has at least one layered different region with a structure which deflects, concentrates or deflects and as well concentrates the light.

14. The apparatus according to claim 13, wherein the light-concentrating structure is provided by a diffractive lens or a diffractive mirror.

15. The apparatus according to claim 14, wherein the foil has a plurality of different lens structure regions or mirror structure regions which are arranged in succession in the tracking direction.

16. The apparatus according to claim 1, wherein the foil is de-reflected on the side towards the light source.

* * * * *